(12) United States Patent
Peiker

(10) Patent No.: US 6,269,258 B1
(45) Date of Patent: Jul. 31, 2001

(54) TELEPHONE HANDSET ESPECIALLY FOR USE IN A VEHICLE

(76) Inventor: Andreas Peiker, Max-Planck-Strasse 32 D61381, Friedrichsdorf (DE)

( * ) Notice: Subject to any disclaimer, the term of this patent is extended or adjusted under 35 U.S.C. 154(b) by 0 days.

(21) Appl. No.: 08/913,053

(22) PCT Filed: Dec. 30, 1996

(86) PCT No.: PCT/IB96/01476
§ 371 Date: Sep. 5, 1997
§ 102(e) Date: Sep. 5, 1997

(87) PCT Pub. No.: WO97/25223
PCT Pub. Date: Jul. 17, 1997

(30) Foreign Application Priority Data

| Jan. 5, 1996 | (AT) | 7/97 U |
| Sep. 13, 1996 | (CH) | 2251/96 |
| Dec. 19, 1996 | (CH) | 3120/96 |

(51) Int. Cl.[7] .................................................. H04B 1/38
(52) U.S. Cl. ............................ 455/569; 455/90; 455/575
(58) Field of Search ............................... 455/90, 125, 127, 455/129, 575, 569, 566, 573; 379/455, 426, 433, 440, 437, 446, 454

(56) References Cited

U.S. PATENT DOCUMENTS

| 5,063,611 | * | 11/1991 | Kitabayashi | 455/90 |
| 5,239,300 | * | 8/1993 | Berger et al. | 455/128 |
| 5,301,224 | * | 4/1994 | Major | 379/332 |
| 5,333,176 | * | 7/1994 | Burke et al. | 455/412 |
| 5,371,783 | * | 12/1994 | Rose et al. | 379/61 |
| 5,404,580 | * | 4/1995 | Simpson et al. | 455/89 |
| 5,561,712 | * | 10/1996 | Nishihara | 455/569 |
| 5,566,226 | * | 10/1996 | Mizoguchi et al. | 455/566 |
| 5,664,015 | * | 9/1997 | Ford et al. | 379/433 |
| 5,797,088 | * | 8/1998 | Stamegna | 455/90 |
| 5,896,564 | * | 4/1999 | Akama et al. | 455/90 |
| 5,956,399 | * | 9/1999 | Whitley et al. | 379/446 |
| 5,995,622 | * | 11/1999 | Roussy et al. | 455/575 |
| 6,043,626 | * | 3/2000 | Snyder et al. | 379/442 |

* cited by examiner

Primary Examiner—William G. Trost
Assistant Examiner—Tilahun Gesesse

(57) ABSTRACT

The telephone apparatus, particularly for use in a motor vehicle, has a hand-held receiver apparatus (3) (Handy) and an insert part (1) for receiving the same. The insert part (1) has preferably at least one function key (31a–c) as well as particularly at least one display element (33a–c). The function key or keys (31a–c) is or are arranged and structured in such a manner that they can be found and operated without eye contact.

Figure 1:
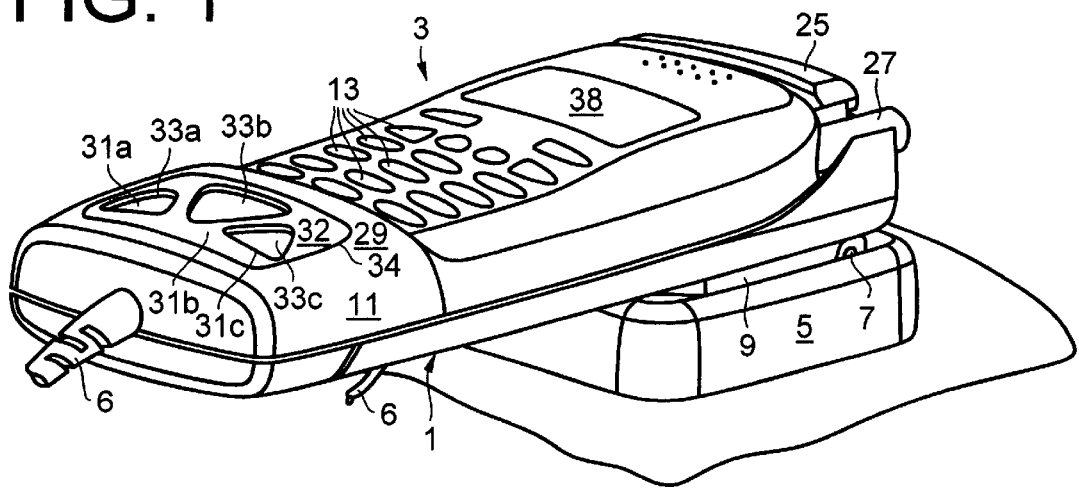

The insert part (1) and the hand-held receiver apparatus (3) have particularly coupling parts (24a, 24b) of a coupling (23) for the signal transmission that can be separated from each other or can grip into each other. At least one of the coupling parts (24a), particularly the one within the insert part (1), has a protective arrangement against the penetration of liquids and/or foreign bodies when the hand-held receiver apparatus is decoupled.

The telephone apparatus (3) is structured in such a way that, when it is separated from the insert part (1) as well as when it is coupled with the same, not only simple communications technical functions can be carried out, but also further services and reports can also be performed partially automatically and/or by means of operators without problems in a function secure manner, particularly in a "rough" environment.

19 Claims, 2 Drawing Sheets

TELEPHONE HANDSET ESPECIALLY FOR USE IN A VEHICLE

The invention concerns a telephone apparatus according to patent claim 1 or according to the preamble of patent claim 7.

Different varieties of telephone apparatus for motor vehicles exist already.

A portable mobile telephone is know from German utility model G 9,311,294.7. It is held by means of a form-fitting and film connection within a holder. The holder is, for example, screwed to the side wall of a central console between the driver and passenger seats inside the motor vehicle.

A holder for a mobile telephone is known from EP 0,545,670 A2 which is made up by two parts that fit one into the other. The outer part is screwed firmly on a support. The inner part represents a kind of rocker, wherein the hand-held receiver apparatus is placed from the front. The rocker can be tilted about a horizontal axis. In the forward position, the rocker is ready for receiving the apparatus. When the rocker is tilted back, it is held by a rest mechanism. The mechanism is released by means of a handle arranged on the bottom side of the rocker which is operated by pushing down the hand-held receiver apparatus into the holder.

A two-part holder for a hand-held receiver apparatus is described in German utility model G 9,311,242.4. Here, an independently standing clip part is attached onto the hand-held receiver apparatus, which has a tongue that can be inserted into a slit of the holder. A HF shield and antenna part is further disclosed, which is connected to an on-board antenna system of the motor vehicle by means of a coaxial cable. The antenna part has a coupling that couples onto the antenna part of the mobile telephone generating a galvanized connection between the antenna part of the hand-held receiver apparatus and the on-board antenna of the motor vehicle. If the hand-held transmitter apparatus has speaker capabilities, then it can be left in the holder for telephoning. If it is not desired that other persons riding in the motor vehicle can hear the conversation, then the receiver apparatus can be removed from the holder, so that the user can telephone by holding the earpiece to his ear. The hand-held receiver apparatus is connected, in both cases, by means of an antenna line with the on-board antenna of the motor vehicle. If the apparatus is to be used outside of the motor vehicle, then the clip part and the shield or antenna part are removed.

The object of the invention is to provide a telephone apparatus with a holder for a handheld receiver apparatus that provides, aside from the purely communications engineering functions, also other services and reports, is partially automatic, and can be carried out by the operator without problem and in a secure fashion, particularly in "rough" surroundings.

The eventualities of normal life such as, for example, spilled beverages that could splash into the below-described insert cover when the hand-held receiver apparatus has been removed, coins that have fallen into the same, and other objects as well as crumbs of food that have fallen into the same are particularly considered under "rough surroundings".

The manner in which this object is attained is the subject of patent claims 1 and 7. The preferred embodiments are described in the dependent claims.

The telephone apparatus of the invention obtains universal application capabilities by means of the integration of further services and reports aside from the communications engineering functions. These universal application capabilities are obtained in that the telephone apparatus consists of a hand-held receiver apparatus and an insert part that receives the same. The insert part has at least one function key and preferably at least one display elements. The function key or keys is or are decoupled from the general dialing functions of a telephone keypad, which results in the additional functions described below, which are not common to a general (conventional) telephone. As explained below, the signal and energy efficient coupling between the insert part and the telephone apparatus is preferably structured so that it is "idiot proof." This "idiot proof" structure is preferred in the uses described herein; it can, of course, also be used for all the uses of a hand-held receiver apparatus that can be removed from a holder (insert part), no matter if it is a so-called Handy with a transmitter technical connection to the terrestrial or satellite sender/receiver installation or merely a sender/receiver installation located nearby, such as with a wireless hand-held receiver apparatus.

The interface between hand-held receiver apparatus and insert part is preferably structured so that the coupling function is not affected even by neglect.

The above-named object is attained further in that the insert part for the hand-held receiver apparatus is structured in such a manner that it serves for receiving the hand-held receiver apparatus and, at the same time, has a signal transmitter means as interface that is seal-tight against the penetration of liquids and/or foreign bodies. In this way, there can be no disturbance of the connection between the insert part and the hand-held receiver apparatus even when there is carelessness. The interface serves as energy supply for the hand-held receiver apparatus as well as for signal transmission, particularly of antenna signals. The interface is preferably a galvanized break-away coupling (transmission). There can also be an inductive, optic, . . . transmission, particularly of telecommunications signals. The signals and energy supply can be transmitted by means of a single coupling or several separate couplings.

The telephone apparatus of the invention is structured in such a manner that it can be used preferably in motor vehicles, wherein as motor vehicles are understood, for example, trucks and also wagons of a train, as well as any kind of self-propelling apparatus. A telephone apparatus such as the one of the invention also can be installed in conference rooms, hotel rooms, etc.

In a preferred embodiment, the insert part has a quiver-shaped lower part for the lower front side of the hand-held receiver apparatus. Function keys or display elements can be arranged on the outside of the quiver. Instead of arranging them herein, they can also preferably be partially or completely placed in the upper part of the insert part.

The quiver or the lower part of the insert part can be opened or fixed. A display unit is preferably provided, which brings the hand-held receiver apparatus after unlocking of the lower part into a position wherein it can be easily grasped. The hand-held receiver apparatus is, therefore, preferably pushed out of the inside of the quiver. As a further advantage, therefore, results the safety against damages to the edge of the quiver. Preferably, a collar-shaped unit according to the above description is used for the quiver-like lower part.

The rear wall of the quiver is preferably pulled over the upper edge, that is, lengthened upward. This lengthening serves as guidance element where the hand-held receiver apparatus will be inserted.

The insert part is preferably shaped as a hand shell. The hand shell is shaped in such a manner that it has an indentation for the hand-held receiver apparatus, so that the same is an integrated component part of the hand shell or appears to be and does not protrude from the same. The hand shell also has a shape that is larger than the hand-held receiver apparatus. When the hand-held receiver apparatus is removed, the hand shell looks as if the corresponding part had been "cut out."

A speaker is preferably installed in the hand shell. A switch ensures that, when the handheld receiver is in the hand shell, the hearing and speaking arrangements of the hand-held receiver apparatus are automatically switched over to those of the hand shell. This switch can, for example, be activated by means of an automatically operated mechanic or electric sensor (activation element). The switching can also be carried out manually.

The insert part can preferably be removed from a console. The console can have a loudspeaker for hand-free telephoning. The insert part itself, for example, can also be screwed onto the inner fittings of the motor vehicle. In this case, the console is not required.

Clamps, clipping, or hook attachments as well as magnetic holders can be used for holding the insert part.

The insert part, as well as the hand-held receiver apparatus can be supplied with current via the console. The current can be used for supplying or loading an accumulator of the hand receiver apparatus. The supply is carried out, preferably, by means of a cable between the console and the insert part.

Further preferred embodiments and feature combinations result from the following detailed description and the totality of the patent claims.

Figure 2:
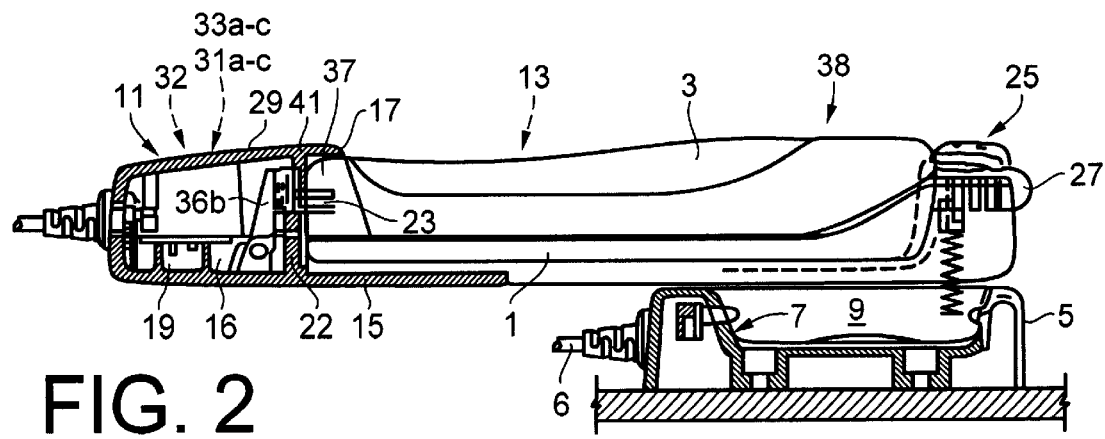
Figure 3:
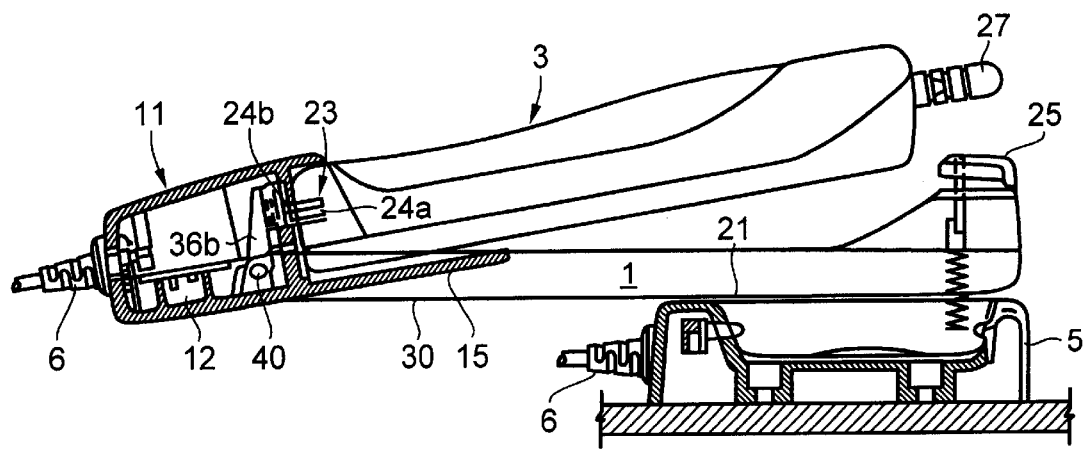
Figure 4:
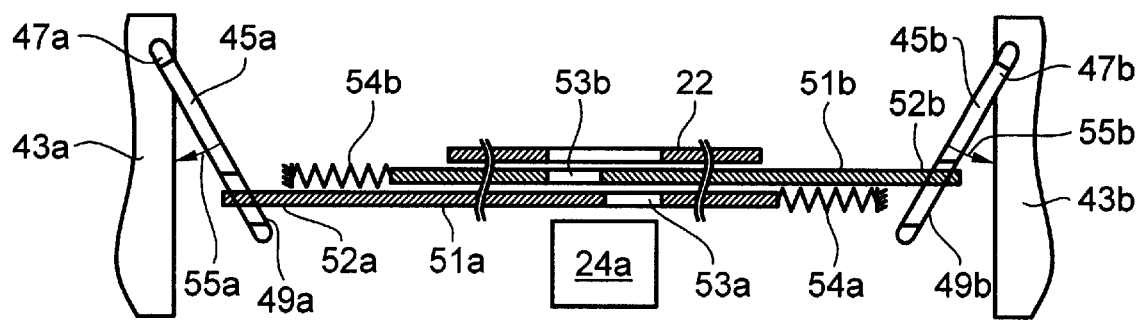
Figure 5:
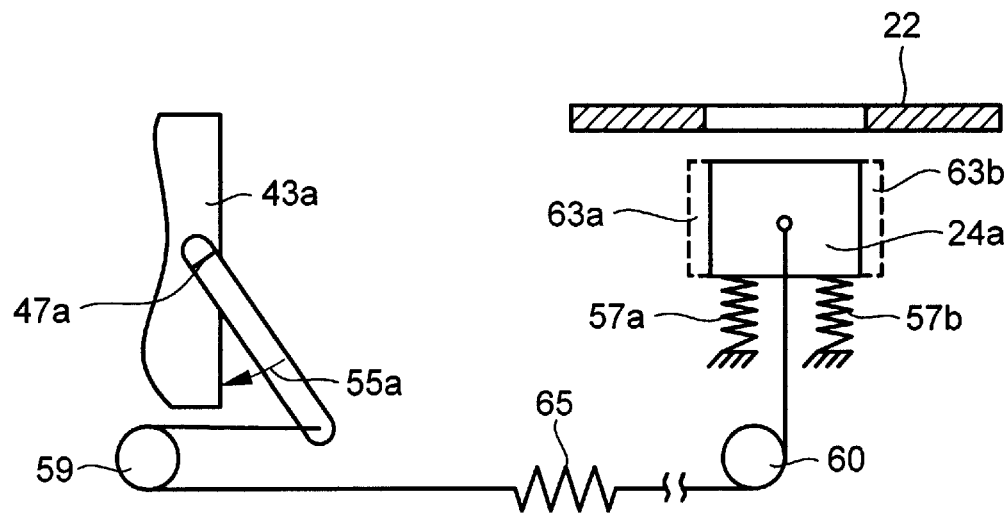

The drawings will be further described for explaining the invention by means of embodiments, wherein FIG. 1 is a schematic illustration of a telephone apparatus according to the invention, FIG. 2 is a longitudinal section through the telephone apparatus shown in FIG. 1 that has a hand-held receiver placed in an insert part, wherein here the electronic wiring as well as the function keys and display elements are left out for reasons of clarity, FIG. 3 is a longitudinal section similar to the one of FIG. 2, but with the lower part of the insert part open, FIG. 4 is a function schematic for a seal-tight cover of a protective arrangement for a signal and energy efficient coupling between the hand-held receiver apparatus and the insert part, as well as FIG. 5 similarly to FIG. 4, is a schematic protective arrangement for the insertion and removal of the coupling part of the coupling.

The wiring in the components and elements was left out or only suggested so as not to overload the illustration.

The telephone apparatus according to the invention, which is illustrated in FIG. 1, has a hand-held receiver apparatus 3 that can be removed from an insert part 1. The insert part 1 is shaped as a hand shell and is also removably held in a console 5. The insert part 1 and the console 5 are connected with one another by means of a cable 6 that can be inserted and removed from both elements and therefore is removable. The insert part 1 can, therefor, be inserted on consoles at other locations by means of corresponding plug and bushing standardization. The insert part 1 and the console 5 are manufactured from plastic by means of a die cast process.

The console 5 is shaped approximately quadratic with an inner molding 7. The attachment of the console 5 on the dashboard of a motor vehicle, on the side wall of the same, or on the side wall of another vehicle (train, bus, . . . ) is carried out, as a rule, by means of screws. The inner molding 7 forms the counterpart to the hearing capsule part 9 formed on the upper part of the insert part 1. The hearing capsule part 9 carries the hearing capsule. The hearing capsule part 9, and therefore the insert part 1, is held in the inner molding 7. Even locking and unlocking elements (for example, knobs, spring latches, . . . ) can be used, which allow a secure hold.

In the lower figure area of FIG. 1, the insert part 1 has a quiver-like shaped lower part 11 with a speaking capsule part 12 that can be opened. The depth of the quiver is only so large that it makes possible holding the hand-held receiver apparatus 3, but allows the dialing keys 13 to be easily within reach. A guidance plate 15 lengthens the rear wall 16 of the lower part 11 above the quiver edge 17. The lower part 11 receives, in this manner, a "slipper-like" appearance. A microphone 19 is arranged on the rear wall 16. The hearing capsule in the hearing capsule 9 and the microphone 19 can be activated by means of a contact pin 21. An activation can, however, also be possible by means of the above-described coupling 23.

A coupling is provided in the bottom of the quiver 22, which acts as an interface 23 for an energy and signal efficient coupling of the hand-held receiver apparatus 3. The coupling 23 has a coupling part shaped as a plug 24a in the lower part 11 and a bushing 24b corresponding thereto that acts as another coupling part in the lower front side 37 of the hand-held receiver apparatus 3. As explained below, the interface 23 is provided with a protective or covering arrangement, which impedes the penetration of liquids and/or foreign bodies.

The mounting of the console 5 on a wall is carried out in such a manner that the hand-held receiver apparatus 3 can be inserted from above into the lower part 11. The dialing keys 13 are left outside when inserting the hand-held receiver apparatus 3, so that their operation is possible even in inserted condition.

In or on the lower part 11 of the opposite lying area of the insert part 1 is arranged a holder part 25 for the hand-held receiver apparatus 3. The holder part 25 has a locking arrangement for the upper part of the hand-held receiver apparatus 3 in or on the insert part 1. The locking arrangement can, as illustrated in FIG. 1, be slid by means of an antenna 27 of the hand-held receiver apparatus 3 for holding the same or can have a locking knob for gripping onto the respective indentation in the upper hand-held receiver apparatus part. Then, the one coupling part of the interface can be arranged into the sliding area of the holding part 25 in the insert part 1. If the holding part provided with a recoil spring snaps back into its former position after a manual operation when the hand-held receiver apparatus has been removed, it covers the coupling part in an seal-tight manner. Instead of sliding the holder part 25 traversally along the longitudinal axis of the hand-held receiver apparatus 3, it can also be shaped in such a way that it can be slid approximately parallel to the longitudinal axis. A coupling arranged in the upper area of the insert part (in FIGS. 1 to 3 of the right area) was then covered by the closing holder part after removal of the hand-held receiver apparatus. The holder part can be provided with a knob, which then grips hermetically with a corresponding nut in the upper front part of the hand-held receiver apparatus.

The hand-held telephone 3 is held in such a manner in the insert part 1, that the dialing keys 13 are freely accessible. Since now the insert part 1 has on the "back" a hearing capsule as well as a microphone, the hand-held receiver apparatus 3 can be used for telephoning without twisting the hand.

Three function keys 31a to 31c are arranged and shaped on the front side 29 of the lower part 11 in such a manner that they can be found and operated without eye contact. So as to be able to feel these function keys 31a to 31c well, they present a profiled surface and have a triangular contour. The complete keypad 32 is shaped, for example, like a trapeze, as shown in FIG. 1. Two neighboring function keys 31a/31b or 31b/31c have the shape of a rhombus. However, also other shapes of keypad can be used. It is only important that the keypad 32 be within eyesight, so that it remains recognizable even at a large view angle and is impressed into the subconscious. In this way, it can be found even when it is out of eye view or at a side view angle.

The function keys 31a to 31c are arranged for protecting against accidental operation. They are preferably arranged in a sunken-in manner. A protruding edge 34 can also be provided around each individual key 31a to 31c and/or, as shown in FIG. 1, they can be built around the keypad 32. The blind feeling of the keys can be made easier in this manner.

The function keys 31a to 31c can then, as shown in FIG. 1, be made of equilateral triangles and the middle function key 31b is larger than the both side keys. Both side function keys 31a and 31c can also be shaped as right-angled triangles, and their hypotenuses run preferably parallel to a neighboring side of the middle function key 31b.

The key functions of the function keys 31a to 31c differ from the functions of the dialing keys 13 of the hand-held receiver telephone 3. Opposite to those, these have functions that do not influence the general telecommunications signals. Their functions are specifically directed to the motor vehicle or location.

When the telephone apparatus of the invention is used in street traffic, such as for example in an automobile, a bus, a truck, or another means of transportation, the function keys 31a to 31c can be assigned to issue an emergency call, an inquiry about traffic conditions, or orientation aid or a request for emergency road service.

A function key arrangement for calling the traveling companion, for distance and/or connection information can be provided when using the apparatus in busses or trains, for example.

When it is installed in a hotel room, for example, the room service can be called and also general location information can be obtained.

According to the specific use of the telephone apparatus of the invention, more or less function keys can be used. Instead of arranging the function keys 31a to 31c in the front side 29 of the lower part 11, the keys can also be arranged on the "head side" of the insert part.

If only individual function keys are used, they are used preferably in motor vehicles for an emergency call function. A connection with the emergency call central can be obtained by means of this function key in a particular embodiment variation. If this connection is established, then one or all of the display elements blink.

It can also be possible to widen the display of the hand-held receiver apparatus by means of one of these function keys. The additional display area reaches from the display 38 to the "hearing capsule area." An additional display can also be provided in the insert part.

Aside from the function keys 31a to 31c, the insert part 1 has display elements 33a to 33c, which are integrated preferably as light-transmitting diodes in the function keys 31a to 31c for the purpose of saving space. These displays can serve for signalizing the corresponding function key. Special display functions can also be called up. A continuous, intermittent, or pulsating illumination with different frequencies and pulse widths can be used for this purpose. Opposite to the illustration of FIG. 1, the display elements can also be arranged separately in the front side 29 of the lower part 11. In another arrangement variation of the function keys, the installation can be carried out in the "head side" of the insert part.

The advantage of arranging the function keys 31a to 31c and display elements 33a to 33c in the insert part 1 lies in that they can be assigned functions specific for their respective uses, independently from the embodiment of the hand-held receiver apparatus 3. In this manner, a standardized general (conventional) hand-held receiver apparatus 3 can always be used. The motor vehicles or localized functions and requirements are acknowledged by a special insert part.

A collar unit 36a and 36b is arranged at the right and left of the coupling 23 in lying position within the lower part 11, even though merely one (36b) of the two collar units 36a and 36b is visible in FIG. 2. The height of the collar units 36a and 36b is so dimensioned, that it corresponds to the tolerance of the width of the insert part 11 from its rear wall 16 to its wall on the front side 29. The collar units 36a and 36b have each a resting surface facing the opening of the lower part 11 on which the lower part 37 of the hand-held receiver apparatus 3 is supported. The standing surfaces lie vertical with respect to the rear wall 30 of the insert part 1 that does not move together with the lower part 11, and parallel to the tilt axis 40 of the lower part 11.

The depth of the lower part 11 is selected so that the lower front side of the hand-held receiver apparatus 3 can be held without problems when the lower part 11 is closed and the handheld receiver apparatus 3 can be easily removed when the lower part is open, without damaging the quiver edge 17, so that particularly no parts will be broken off or torn.

The lower part of the insert part does not necessarily have to tilt up; it can also be fixed. In this way, neither the effect of the above-described function keys and display elements nor the below-described effect of the connection means provided with a protective arrangement are influenced.

The coupling 23 is here, for example, structured as a break-away galvanic coupling with several electric contacts. One coupling part 24b is arranged in such a manner in the lower front part 37 of the hand-held receiver apparatus 3, that no parts protrude. The other coupling part 24a corresponding thereto is located in the lower part 11. When the hand-held receiver apparatus 3 is inserted, both coupling parts 24a and 24b slide one into the other, forming an electric connection. The coupling 23 is now provided with a protective arrangement, which protects the electric contacts from the penetration of liquids and/or foreign bodies.

The protection against spilt water and/or foreign bodies, as mentioned above, can now be carried out by sliding the holder piece 25 over the coupling part located in the insert part, and the coupling is then no longer arranged in the lower part 11, but in the sliding area of the holder piece; it is, then, located in the upper part of the insert part 1.

An embodiment variation of the protection is shown schematically in FIGS. 4 and 5. For better understanding, the seal-tight cover function of FIG. 4 is shown separately from the sliding function of the connection part 41 in FIG. 5.

The lower part 11, when the hand-held receiver apparatus 3 is removed, has schematically illustrated tiltable tongues 45a and 45b in each one of the side quiver walls 43a and 43b. The tongue tilting bearings 47a and 47b are arranged within the walls of the quiver walls 43a and 43b. The tongue ends facing the tilt bearings 47a and 47b lie below the quiver bottom 22. On these tongue ends are held sliding plates 51a and 51b, each movable by means of an axis 52a or 52b within a longitudinal slit 49a or 49b. Both sliding plates 51a and 51b have a slit 53a or 53b larger by one tolerance than half of the width of the plug-like connection parts 41. The slit width is larger by one tolerance than the thickness of the connection part 41. Both sliding plates 51a and 51b form the opposite ends of the axis 52a and 52b and each is tensioned in the longitudinal direction by means of a spring 54a or 54b. FIG. 4 shows the elements in a position with the hand-held receiver apparatus 3 removed. When the hand-held receiver apparatus 3 is removed, the openings 53a and 53b are positioned in such a way, that the upper side of the coupling part 24a in the lower part 11 is protected against water spillage.

If now the lower front side 37 of the hand-held receiver apparatus 3 is pushed into the lower part 11, then the tongues 45a and 45b arranged within the quiver side walls 43a and 43b are pressed in the direction of the arrows 55a and 55b against the force of the springs 54a and 54b. In this way, both sliding plates 51a and 51b are slid, until both slits 53a and 53b are connected with one another one over the other. The entrance of the coupling part 24a is now free for receiving the other coupling part 24b in the lower front side 37 of the hand-held receiver apparatus 3.

The sliding function of the coupling part 24a is explained with reference to the illustration of FIG. 5. This figure shows the condition of the coupling part 24a also with the hand-held receiver apparatus 3 removed. In this way, the coupling part 24a is held against the force of the pressure springs 57a and 57b in a position below the quiver bottom 22. Both slits 53a and 53b in the sliding plates are, as shown in FIG. 5, in the position of protection against water spills. The tongue 45a shown in FIG. 5 (identical to the one shown in FIG. 4) is held in the illustrated position. A deviated pulley 61 of the connection part 41 is attached by means of one or two rolls 59 and 60 to the axis 52a (identical with the one in FIG. 4). The connection part 41 can be slid vertical to the quiver bottom 22 along two longitudinal guides 63a and 63b. The edges of a plate serve, for example, as longitudinal guides 63a and 63b. The pulley 61 is held under tension by means of a spring 65 installed therein.

If the lower front part 37 of the hand-held receiver apparatus 3 is pushed in, then, as already explained, the tongue 45a moves in the direction of the arrow 55a. In this manner, the coupling part 24a can be pushed upward by means of the force of the springs 57a and 57b. This, however, is still not possible, since both slits 53a and 53b cannot release the complete coupling part section. The released pulley path of the pulley 61 is received by the spring 65. Only when both slits 53a and 53b have been moved apart widely enough by pushing, then the coupling part 24a is propelled upward into the corresponding coupling part 24b in the upper front side 37 of the hand-held receiver apparatus 3.

A second tongue can be used for sliding the coupling part 24a to avoid this delaying second movement. In this case, the three tongues can no longer be provided with a straight insert line, but with a bent course adapted to the required movement.

A rubber elastic seal-tight protective arrangement can also be used instead of the above-described mechanic protective arrangement. The coupling part arranged in the lower part or in another area of the insert part 1 has a protective wall that also opens to the bottom. This protective arrangement consists, expressed in a simplified manner, of a liquid-filled bubble under pressure, which has a membrane in the area of the lower opening of the protective wall. The wall of the bubble is made of elastic material. The elasticity coefficient of the membrane is smaller than that of the rest of the bubble wall. Due to the bubble pressure, this membrane pushes into the free area of the protective wall and thereby seals water-tight the contacts surrounded by the protective wall. When the lower front part of the hand-held receiver apparatus is inserted in the lower part, the coupling part of the membrane is pushed out of the free space of the protective wall by means of its corresponding coupling part.

Depending upon the embodiment of the hand-held receiver apparatus, the coupling for the signal and/or energy efficient transmission can be provided in the lower area of the insert part, on its side, or at another location. In this way, the coupling parts can be structured so that the signal and/or energy effective transmission is contactless, particularly inductive or carried out by means of magnetic waves. The inductive transmission was selected especially for the energy transmission, for example, for an accumulator in the hand-held receiver apparatus, but can also be carried out for transmitting transmitter technical signals. Electromagnetic waves, particularly visible or infrared light, are used for the transmitter technical transmission and for the transmission of control signals. Sender/receiver diodes, which are separated merely by means of a transparent window, will be installed in the hand-held receiver apparatus as well as in the insert part. The window serves as protective arrangement for protecting from the penetration of fluids and/or foreign bodies. This embodiment also provides an excellent protection when the hand-held receiver apparatus is set in place. This construction can be built problem-free and water-tight, particularly in the connection with the inductive energy transmission.

What is claimed is:

1. A telephone apparatus comprising:
   a hand-held telephone unit;
   a shell for housing said telephone unit, said shell being shaped so as to be readily graspable by hand, wherein said hand-held telephone unit is removable from said shell, said shell including a quiver at a lower portion of said shell for engaging a front of said hand-held telephone unit and being swivel-mounted relative to said shell between an open position and a closed position, said hand-held telephone unit being removable from said quiver in said open position, at least one function key being provided on said quiver; and
   a mount to which said shell is engageable.

2. The apparatus according to claim 1, wherein said at least one function key is identifiable by non-visual means.

3. The apparatus according to claim 2, wherein each said at least one function key is uniquely shaped so as to be identifiable by touch.

4. The apparatus according to claim 1, wherein said at least one function key is operable to dial a preprogrammed telephone number.

5. The apparatus according to claim 4, wherein said preprogrammed telephone number corresponds to at least one of emergency services, vehicle breakdown services, travel information services, and traffic information services.

6. The apparatus according to claim 1, wherein said at least one function key is protected from inadvertent actuation.

7. The apparatus according to claim 6, wherein said at least one function key is recessed from a surface of said shell.

8. The apparatus according to claim 7, wherein said shell includes a ridge provided on a periphery of said at least one function key.

9. The apparatus according to claim 6, wherein said shell includes a ridge provided on a periphery of said at least one function key.

10. The apparatus according to claim 1, wherein said shell includes a connector for establishing an electrical connection with said mount.

11. The apparatus according to claim 10, wherein said connector is constructed and arranged to transmit at least one of a communication signal and electrical power.

12. The apparatus according to claim 1, wherein said telephone unit and said shell having corresponding connectors for transmitting a communication signal.

13. The apparatus according to claim 12, wherein at least one said connector is resistant to penetration by liquid and solid contaminants.

14. The apparatus according to claim 12, wherein said connectors establish a connection therebetween without physical contact therebetween.

15. The apparatus according to claim 12, wherein at least one said connector is covered by a sliding cover member when the telephone unit is not housed in said shell.

16. The apparatus according to claim 15, wherein said sliding cover member is a resiliently-biased cover member constructed and arranged to be biased towards a position in which said cover member covers said at least one connector and to be displaced from said position by the engagement of said telephone unit in said shell.

17. The apparatus according to claim 1, wherein said shell includes a speaker mechanism and a microphone mechanism whereby the combination of said telephone unit housed in said shell is functional as a telephone.

18. The apparatus according to claim 1, wherein said shell has at least one function display element.

19. The apparatus according to claim 18, wherein said quiver has at least one function display element.

* * * * *